United States Patent
Linde et al.

(10) Patent No.: US 9,635,493 B2
(45) Date of Patent: Apr. 25, 2017

(54) AUDIO TRANSFER USING THE BLUETOOTH LOW ENERGY STANDARD

(71) Applicant: Apple Inc., Cupertino, CA (US)

(72) Inventors: Joakim Linde, Palo Alto, CA (US); Brian J. Tucker, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/489,090

(22) Filed: Sep. 17, 2014

(65) Prior Publication Data
US 2015/0004913 A1 Jan. 1, 2015

Related U.S. Application Data

(63) Continuation of application No. 13/403,605, filed on Feb. 23, 2012, now Pat. No. 8,849,202.
(Continued)

(51) Int. Cl.
*H04B 7/00* (2006.01)
*H04W 4/00* (2009.01)
(Continued)

(52) U.S. Cl.
CPC ............ *H04W 4/008* (2013.01); *H04L 69/22* (2013.01); *H04W 80/02* (2013.01);
(Continued)

(58) Field of Classification Search
CPC . H04L 69/22; H04M 1/7253; H04M 1/72591; H04M 2250/02; H04W 80/02; H04W 84/18
(Continued)

(56) References Cited

U.S. PATENT DOCUMENTS 6,804,251 B1 * 10/2004 Limb ................... H04L 12/66
370/444
8,849,202 B2 9/2014 Linde et al.
(Continued)

FOREIGN PATENT DOCUMENTS

EP 1355469 A1 10/2003
KR 20010066434 7/2001
(Continued)

OTHER PUBLICATIONS

Hyun-Woo Lee, Xenodigm Tech., Republic of Korea, "Proposal on light-weight realtime transport protocal for audio on USN" ITU-T drafts; study period 2005-2008, International Telecommunication Union, Geneva; CH, vol. Study Group 16; 22/16, Apr. 14, 2008, pp. 1-6, XP017542125, sections 1. and 3.1.
(Continued)

*Primary Examiner* — Ping Hsieh
*Assistant Examiner* — Xin Jia
(74) *Attorney, Agent, or Firm* — Sterne, Kessler, Goldstein and Fox P.L.L.C.

(57) ABSTRACT

The described embodiments include a system for communicating between electronic devices. During operation, a receiving electronic device receives a data channel protocol data unit (PDU) in a link layer of a Bluetooth Low Energy (BTLE) protocol stack. The receiving electronic device then reads a field in a header of the data channel PDU to determine if the header indicates that a payload of the data channel PDU contains audio data. When the header indicates that the payload of the data channel PDU contains audio data, the receiving electronic device is configured to send the audio data from the payload to an audio layer in the BTLE protocol stack for processing.

23 Claims, 8 Drawing Sheets

Related U.S. Application Data

(60) Provisional application No. 61/525,676, filed on Aug. 19, 2011.

(51) Int. Cl.
*H04W 80/02* (2009.01)
*H04L 29/06* (2006.01)
*H04W 84/18* (2009.01)
*H04M 1/725* (2006.01)

(52) U.S. Cl.
CPC ...... *H04M 1/7253* (2013.01); *H04M 1/72591* (2013.01); *H04M 2250/02* (2013.01); *H04W 84/18* (2013.01)

(58) Field of Classification Search
USPC .......................................................... 455/41.2
See application file for complete search history.

(56) References Cited

U.S. PATENT DOCUMENTS

| | | |
|---|---|---|
| 2007/0259621 A1 | 11/2007 | Lin |
| 2008/0117848 A1 | 5/2008 | Yang et al. |
| 2008/0125037 A1* | 5/2008 | Ibrahim et al. ............. 455/41.2 |
| 2008/0305819 A1 | 12/2008 | Chun et al. |
| 2010/0125454 A1 | 5/2010 | Zopf et al. |
| 2010/0302979 A1* | 12/2010 | Reunamaki ................. 370/311 |
| 2011/0039492 A1* | 2/2011 | Johnson ............... H04H 20/103 455/3.05 |
| 2011/0217967 A1* | 9/2011 | Cohen et al. ................ 455/418 |
| 2012/0028567 A1* | 2/2012 | Marko ........................ 455/3.02 |
| 2012/0220351 A1* | 8/2012 | Kerai et al. .................. 455/574 |
| 2013/0045684 A1 | 2/2013 | Linde et al. |

FOREIGN PATENT DOCUMENTS

| | | |
|---|---|---|
| TW | I331858 | 6/2008 |
| TW | I338525 | 3/2011 |

OTHER PUBLICATIONS

"Ultra Low Power (ULP) Bluetooth Technology", Internet Citation Aug. 9, 2007, pp. 1-29, XP002487550, Retrieved from the internet: www.nds.fi/images/pd%20tiedostot/Bluetooth%20Ultra%20Low%20Power%20(ULP).pdf, pp. 3-9, pp. 17-19, pp. 27.

English-Language Abstract for "Research on the Co-channel Interference among Multiple Bluetooth Piconets," Jinfeng, Master Degree Thesis in Jilin University, published Jun. 1, 2011; pp. 1-11.

Opinion according to the Notification of Reasons for Refusal, Written Opinion (Written Reply, Written Substantiation) (with English language translation) directed to related Korean Patent Application No. 2014-7006911, mailed Jun. 29, 2015; 2 pages.

English-Language Abstract for Korean Patent Publication No. 2001-0066434, published Jul. 11, 2001; 1 page.

Written Decision on Registration (with English language translation) directed to related Korean Patent Application No. 2014-7006911, mailed Jun. 29, 2015; 1 page.

International Search Report directed to related International Application No. PCT/US2012/050734, issued Feb. 28, 2013; 4 pages.

Written Opinion of the International Searching Authority directed to related International Application No. PCT/US2012/050734, issued Feb. 19, 2014; 4 pages.

First Office Action (with English language translation) directed to related Chinese Patent Application No. 2012-80040346, mailed Nov. 23, 2015; 6 pages.

* cited by examiner

AUDIO TRANSFER USING THE BLUETOOTH LOW ENERGY STANDARD

RELATED APPLICATIONS

This application is a continuation of, and hereby claims priority to, pending U.S. patent application Ser. No. 13/403,605, which is titled "Audio Transfer Using the Bluetooth Low Energy Standard," by the same inventors, which was filed on 23 Feb. 2012. This application also claims priority to U.S. provisional patent application No. 61/525,676, which was filed on 19 Aug. 2011, and to which parent application Ser. No. 13/403,605 claims priority. Each of these applications is incorporated by reference.

BACKGROUND

Field

The described embodiments relate to electronic devices with network connections. More specifically, the described embodiments relate to electronic devices that transfer audio using the Bluetooth Low Energy standard.

Related Art

There are numerous situations in which a person may want or need to use an assistive-listening device (e.g., a hearing aid) to enable the person to hear given source of sound. For example, a hearing-impaired person may need an assistive-listening device to amplify sound to the point where the sound can be perceived. As another example, a person in an environment where transmitting clearly audible sound through the air is difficult or impossible (e.g., a person in a large crowd listening to another person speak) may wish to use an assistive-listening device amplify a particular source of sound.

Generally, assistive-listening devices, and particularly assistive-listening devices such as in-ear hearing aids, are of small form factors, meaning that the batteries that power the devices correspondingly small. For this reason, many assistive listening devices have very restrictive power-consumption requirements. Given the restrictive power-consumption requirements, the options available for wirelessly transmitting audio to existing assistive-listening devices have been limited. Designers have therefore created proprietary systems for wirelessly transmitting audio to assistive-listening devices. However, for numerous reasons (expense, complexity, external equipment, etc.), these systems have not been widely adopted.

Although there are a number of widely-available standards for wirelessly transmitting audio between devices, the standards typically require the consumption of too much power for implementation in assistive-listening devices. For example, many modern electronic devices use the Bluetooth Classic standard ("BTC") for wirelessly transmitting audio (BTC is described in the Core v. 4.0 Specification for the Bluetooth System from the Bluetooth Special Interest Group (SIG) of Kirkland, Wash.). However, BTC consumes too much power to be implemented in most assistive-listening devices.

Although using BTC consumes too much power to be used for transmitting audio to assistive-listening devices, the Bluetooth Specification also describes the Bluetooth Low Energy standard ("BTLE") that enables data transfer using significantly less power than BTC. BTLE is typically used to transmit data between "slave" devices such as low-power sensors and "master" devices that can include more processing power. For example, some athletic heart-rate monitors use the BTLE standard to transmit heart rate data to a receiver such as a wrist-mounted computer or exercise equipment. However, the Bluetooth Specification does not describe a technique for transmitting and processing audio using BTLE.

SUMMARY

The described embodiments include a system for communicating between electronic devices. During operation, a receiving electronic device receives a data channel protocol data unit (PDU) in a link layer of a Bluetooth Low Energy (BTLE) protocol stack. The receiving electronic device then reads a field in a header of the data channel PDU to determine if the header indicates that a payload of the data channel PDU contains audio data. When the header indicates that the payload of the data channel PDU contains audio data, the receiving electronic device is configured to send the audio data from the payload to an audio layer in the BTLE protocol stack for processing.

In some embodiments, from the audio layer, the receiving electronic device sends the audio data to an audio data processor in an audio subsystem in the receiving electronic device. The audio data processor then performs one or more operations to generate processed digital audio data from the audio data, and performs one or more operations to generate an analog signal from the processed digital audio data.

In some embodiments, when sending the audio data from the audio layer to the audio data processor, the receiving electronic device is configured to determine one or more configuration settings in the receiving electronic device. Then, based on the one or more configuration settings, the receiving electronic device is configured to determine the one or more operations to be performed to generate processed digital audio data from the audio data. Next, based on the one or more operations to be performed, the receiving electronic device is configured to send the audio data from the audio layer to at least one corresponding processor in the audio data processor.

In some embodiments, when determining the operations to be performed to generate processed digital audio data from the audio data, the receiving electronic device is configured to determine a type of decoder to be used to decode the audio data from the payload of the data channel PDU. Then, when sending the audio data from the audio layer to the corresponding processor, the receiving electronic device is configured to send the audio data to the determined type of decoder for subsequent decoding.

In some embodiments, when performing the one or more operations to generate the processed digital audio data, the receiving electronic device is configured to at least one of decompress the audio data, decode the audio data, or convert the audio data into a different format of audio data.

In some embodiments, the receiving electronic device is configured to output the analog signal to at least one transducer and generate an output signal using the transducer. Note that the output signal is generally a signal that can be perceived as sound.

In some embodiments, the receiving electronic device is configured to receive a data channel PDU in an L2CAP layer of the Bluetooth Low Energy (BTLE) protocol stack. Upon determining that the data channel PDU is a configuration packet that includes information that one or more applications use in updating a configuration of at least one of the audio layer, an audio data processor in an audio subsystem, or an audio transducer, the receiving electronic device is configured to send information from the data channel PDU to the one or more applications. The one or more applications (which are executed by the receiving electronic device), can then configure at least one of the audio layer, an audio data processor in an audio subsystem, or an audio transducer in accordance with the information from the data channel PDU.

In some embodiments, the receiving electronic device is configured to receive a data channel PDU in a link layer of the Bluetooth Low Energy (BTLE) protocol stack. Upon determining that the data channel PDU is a configuration packet that includes information to be used to configure one or more lower layers of the BTLE protocol stack, the receiving electronic device is configured to configure the one or more lower layers of the BTLE protocol stack in accordance with the information from the data channel PDU.

In some embodiments, when configuring the one or more lower layers of the BTLE protocol stack in accordance with the information from the data channel PDU, the receiving electronic device is configured to increase or decrease a connection interval based on the information from the data channel PDU.

In some embodiments, the field in the header of the data channel PDU is an LLID field.

In some embodiments, the header indicates that a payload of the data channel PDU contains audio data when a value in the LLID field is 00.

In some embodiments, when the header indicates that the payload of the data channel PDU does not contain audio data, the receiving electronic device is configured to process the data channel PDU according to the value in the LLID field.

In some embodiments, the receiving electronic device is an assistive-listening device.

In the described embodiments, during operation, a sending electronic device generates a data channel PDU, by: (1) writing audio data in a payload of the data channel PDU; and (2) setting an LLID in a header of the data channel PDU to indicate that the payload of the data channel PDU contains audio data. The sending electronic device then uses a Bluetooth Low Energy (BTLE) network connection to send the data channel PDU to a receiving device.

In some embodiments, when writing audio data in a payload of the data channel PDU, the sending electronic device is configured to write the entire payload of the data channel PDU with audio data, up to a maximum allowed size (e.g., in octets) of the payload.

In some embodiments, the sending electronic device is configured to receive an analog audio signal. The sending electronic device then determines a type of audio processing to be performed on the analog audio signal to generate a digital output to be sent to the receiving electronic device. Next, the sending electronic device performs the audio processing to generate the digital output from the analog audio signal, wherein the sending electronic device subsequently uses the digital output as the audio data.

In some embodiments, the sending electronic device is configured to configure at least one of the sending electronic device or the receiving electronic device by: (1) sending one or more data channel PDUs to the receiving electronic device, wherein each of the data channel PDUs comprises configuration information; (2) receiving one or more data channel PDUs with responses; and (3) based on the responses to the requests, configuring at least one of the sending electronic device or the receiving electronic device to process audio data in subsequent data channel PDUs that contain audio data.

In some embodiments, the sending electronic device is configured to configure at least one of the electronic device or the receiving electronic device by: (1) determining that a connection interval is to be increased or decreased; (2) sending one or more data channel PDUs to the receiving electronic device to cause the receiving electronic device to increase or decrease the connection interval; and upon receiving a response from the receiving electronic device indicating that the connection interval has been increased or decreased in the receiving electronic device, increasing or decreasing the connection interval in the sending electronic device.

BRIEF DESCRIPTION OF THE FIGURES

In the figures, like reference numerals refer to the same figure elements.

DETAILED DESCRIPTION

Figure 1:
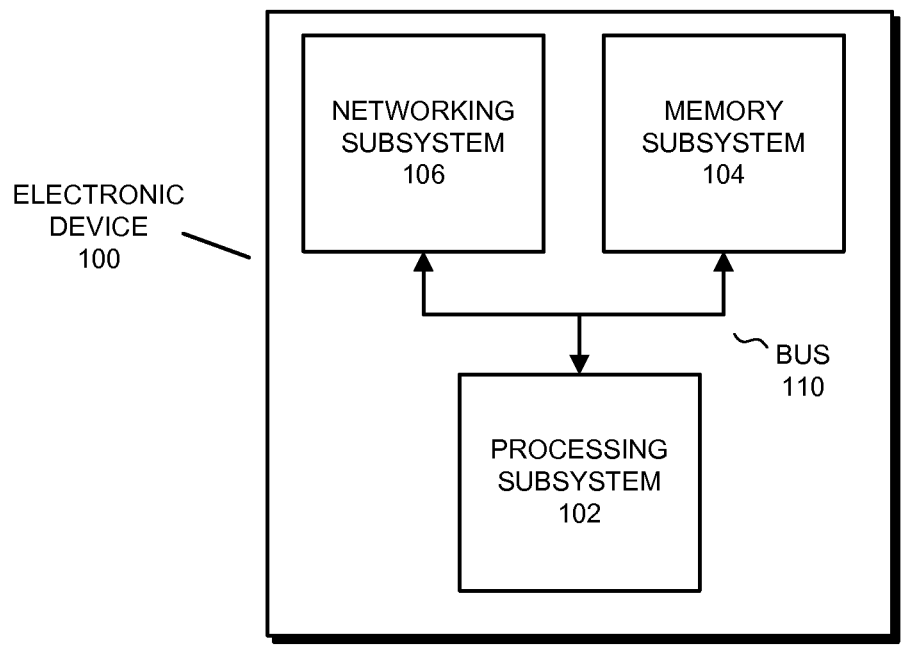
FIG. 1 presents a block diagram of an electronic device in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description can be stored on a computer-readable storage medium. The computer-readable storage medium can include any device or medium (or combination of devices and/or mediums) that can store data structures and code for use by a computer system/electronic device. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that in the described embodiments, the computer-readable storage medium does not include non-statutory computer-readable storage mediums such as transmission signals.

The methods and processes described in the following description can be embodied as program code that is stored in a computer-readable storage medium. When a computer system (see, e.g., electronic device 100 in FIG. 1 or assistive-listening device 200 in FIG. 2) reads and executes the program code stored on the computer-readable storage medium, the computer system performs the methods and processes in the program code stored in the computer-readable storage medium.

The methods and processes described in the following description can be included in hardware modules. For example, the hardware modules can include, but are not limited to, processors, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that can be configured (e.g., by executing instructions) to perform the methods and processes. For example, in some embodiments, processing subsystem 102 (see FIG. 1) can acquire instructions from memory subsystem 104 and execute the instructions to cause processing subsystem 102 to perform the processes and operations in the described embodiments (the same is true for processing subsystem 202 and memory subsystem 204 in FIG. 2). In some embodiments, the instructions are firmware.

Overview

The described embodiments use a modified version of the Bluetooth Low Energy standard (herein referred to as "BTLE") to transmit audio (in the form of audio data) between devices. The existing BTLE standard is described in the Core v. 4.0 Specification for the Bluetooth System from the Bluetooth Special Interest Group (SIG) of Kirkland, Wash., which was published on 30 Jun. 2010. The Core v. 4.0 Specification for the Bluetooth System is hereby incorporated by reference to describe the aspects of the BTLE standard that are not herein described (and is hereinafter interchangeably referred to as "the BTLE specification").

As discussed above, the BTLE standard as described in the Bluetooth Specification does not include the capability to transfer and process audio data. However, the described embodiments comprise an improved version of the BTLE standard that enables the transfer and processing of audio data. The improved version of the BTLE standard in the described embodiments comprises: (1) an updated type of protocol data units ("PDUs" or "messages"); (2) a modified version of the BTLE protocol stack; and (3) additional control/configuration mechanisms, which are used to enable the transfer and processing of audio between electronic devices.

In some embodiments, a predetermined field in data channel PDUs is used to indicate to a receiver of the data channel PDU that the data in the payload portion of the data channel PDU is audio data. In some embodiments, the field in the data channel PDU can be an existing field such as the link-layer ID (LLID) field in which a value is written to distinguish the data channel PDU with audio data in the payload from other data channel PDUs (e.g., to distinguish the audio PDU from LL data PDUs and LL control PDUs).

In some embodiments, the modified version of the BTLE protocol stack includes an audio layer. The audio layer is a layer located above the link layer in the protocol stack that accepts digitally encoded audio data from the link layer for processing. In the described embodiments, upon receiving a data channel PDU for which the predetermined field is set to indicate that the payload is audio data, the link layer forwards the payload/audio data directly to the audio layer for subsequent processing. In some embodiments, the audio layer and/or applications above the audio layer can perform one or more processing steps to generate an analog signal from audio data in payloads of data channel PDUs, and a transducer can be used to output a signal generated from the analog signal.

In some embodiments, the control mechanisms include mechanisms that enable a transmitting device and a receiving device to communicate information about the capabilities of the transmitting device and/or the receiving device so that the transmitting device and/or receiving device can configure the audio data or the other device for transmission, decoding, and/or playback on the receiving device.

Electronic Device and Assistive-Listening Device

FIG. 1 presents a block diagram of electronic device 100 in accordance with the described embodiments. Electronic device 100 includes processing subsystem 102, memory subsystem 104, and networking subsystem 106.

Processing subsystem 102 can include one or more devices configured to perform computational operations. For example, processing subsystem 102 can include, but is not limited to, one or more microprocessors, ASICs, microcontrollers, or programmable-logic devices.

Memory subsystem 104 can include one or more devices for storing data and/or instructions for processing subsystem 102 and networking subsystem 106. For example, memory subsystem 104 can include DRAM, flash memory, and/or other types of memory. In addition, memory subsystem 104 can include mechanisms for controlling access to the memory. In some embodiments, memory subsystem 104 includes a memory hierarchy that includes an arrangement of one or more caches coupled to a memory for electronic device 100. In some of these embodiments, one or more of the caches is located in processing subsystem 102.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by electronic device 100 as fast-access storage for often-used data, while the mass-storage device is used to store less frequently used data.

Networking subsystem 106 can include one or more devices configured to couple to and communicate on a wired and/or wireless network (i.e., to perform network operations). For example, networking subsystem 106 can include, but is not limited to, a Bluetooth networking system (including support for the BTLE standard), a cellular networking system (e.g., a 3G/4G network), a universal serial bus (USB) networking system, a networking system based on the standards described in Institute for Electrical and Electronic Engineers (IEEE) 802.11 (i.e., an 802.11 wireless network), an Ethernet networking system, or a wired or wireless personal-area networking (PAN) system (e.g., an infrared data association (IrDA), ultra-wideband (UWB), Z-Wave, or a network based on the standards described in IEEE 802.15).

Networking subsystem 106 can include controllers, radios/antennas for wireless network connections, sockets/plugs for hard-wired electrical connections, and/or other devices used for coupling to, communicating on, and handling data and events on a wired and/or wireless network. In some of these embodiments, networking subsystem 106 can include one or more mechanisms for forming an ad hoc network connection with other devices. In the following description, we refer to a subset of the mechanisms used for coupling to, communicating on, and handling data and events on the network at the physical layer of each network connection collectively as the "interface" for the corresponding network connection.

Within electronic device 100, processing subsystem 102, memory subsystem 104, and networking subsystem 106 are coupled together using bus 110. Bus 110 is an electrical connection that processing subsystem 102, memory subsystem 104, and networking subsystem 106 use to communicate commands and data to each other. Although only one bus 110 is shown for clarity, different embodiments can include a different number or configuration of electrical connections between the subsystems.

Electronic device 100 can be, or can be incorporated into, many different types of electronic devices. Generally, these electronic devices include any device that can communicate audio data to a receiving device. For example, electronic device 100 can be part of a desktop computer, a laptop computer, a server, a media player, an appliance, a subnotebook/netbook, a tablet computer, a smart-phone, a piece of testing equipment, a network appliance, a set-top box, a personal digital assistant (PDA), a smart phone, a toy, a controller, or another device.

Although specific components are used to describe electronic device 100, in alternative embodiments, different components and/or subsystems may be present in electronic device 100. For example, electronic device 100 may include one or more additional processing subsystems 102, memory subsystems 104, and/or networking subsystems 106. Alternatively, one or more of the subsystems may not be present in electronic device 100. Moreover, although separate subsystems are shown in FIG. 1, in some embodiments, some or all of a given subsystem can be integrated into one or more of the other subsystems in electronic device 100.

In some embodiments, electronic device 100 may include one or more additional subsystems that are not shown in FIG. 1. For example, electronic device 100 can include, but is not limited to, a display subsystem for displaying information on a display, a data collection subsystem, an audio subsystem, an alarm subsystem, a media processing subsystem, and/or an input/output (I/O) subsystem.

Figure 2:
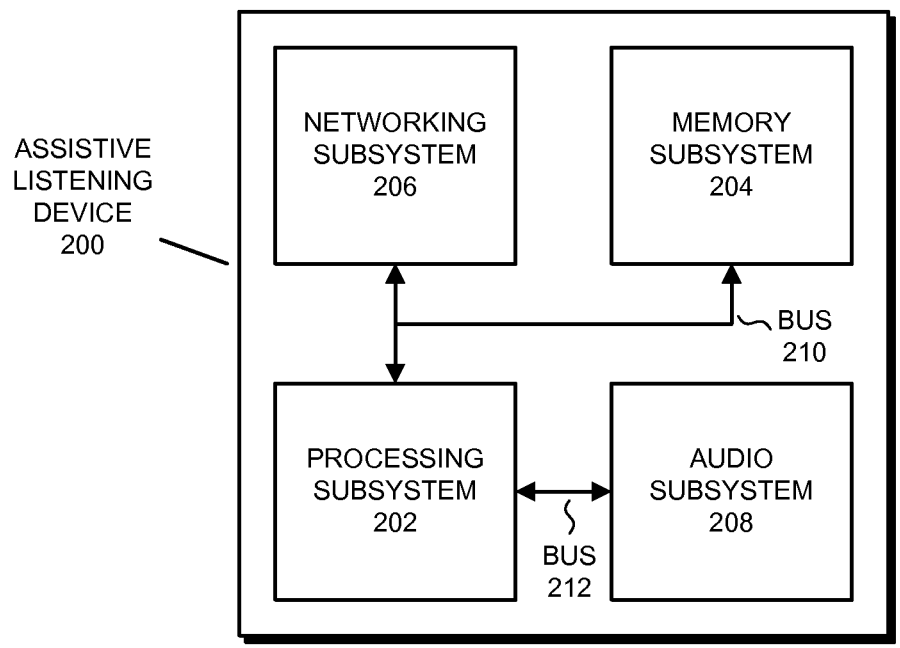
FIG. 2 presents a block diagram of an assistive-listening device in accordance with the described embodiments.

FIG. 2 presents a block diagram of an assistive-listening device 200 in accordance with the described embodiments. Generally, assistive-listening device 200 is an electronic device enables the person to perceive sound (i.e., hear or otherwise be aware of the sound). Assistive-listening device 200 includes processing subsystem 202, memory subsystem 204, networking subsystem 206, and audio subsystem 208.

Processing subsystem 202 can include one or more devices configured to perform computational operations. For example, processing subsystem 202 can include, but is not limited to, one or more processors, ASICs, microcontrollers, digital signal processors, or programmable-logic devices.

Memory subsystem 204 can include one or more devices for storing data and/or instructions for processing subsystem 202 and networking subsystem 206. For example, memory subsystem 204 can include DRAM, flash memory, and/or other types of memory. In addition, memory subsystem 204 can include mechanisms for controlling access to the memory. In some embodiments, memory subsystem 204 includes a memory hierarchy that includes an arrangement of one or more caches coupled to a memory for assistive-listening device 200. In some of these embodiments, one or more of the caches is located in processing subsystem 202.

Networking subsystem 206 can include one or more devices configured to couple to and communicate on a wired and/or wireless network (i.e., to perform network operations). For example, networking subsystem 206 can include, but is not limited to, a Bluetooth networking system (including support for the BTLE standard), a cellular networking system (e.g., a 3G/4G network), a networking system based on the standards described in Institute for Electrical and Electronic Engineers (IEEE) 802.11 (i.e., an 802.11 wireless network), or a wireless personal-area networking (PAN) system (e.g., an infrared data association (IrDA), ultra-wideband (UWB), Z-Wave, or a network based on the standards described in IEEE 802.15).

Networking subsystem 206 can include controllers, radios/antennas for wireless network connections, sockets/plugs for hard-wired electrical connections, and/or other devices used for coupling to, communicating on, and handling data and events on a wired and/or wireless network. In some of these embodiments, networking subsystem 206 can include one or more mechanisms for forming an ad hoc network connection with other devices. In the following description, we refer to a subset of the mechanisms used for coupling to, communicating on, and handling data and events on the network at the physical layer of each network connection collectively as the "interface" for the corresponding network connection.

In some embodiments, the Bluetooth networking system in networking subsystem 206 is configured as a single-mode Bluetooth networking system, whereas in other embodiments, the Bluetooth networking system in networking subsystem 206 is configured as a dual-mode Bluetooth networking system.

Audio subsystem 208 can include one or more transducers configured to generate and/or output signals that a user of assistive-listening device 200 can perceive as sound. For example, audio subsystem 208 can include speakers, amplifiers, drivers, vibrating mechanisms, lights, and/or other transducers. Additionally, in some embodiments, audio subsystem 208 includes one or more decoder circuits, transcoder circuits, converter circuits, and/or other devices for processing audio data.

In some embodiments, processing subsystem 202 provides an analog signal (e.g., on bus 212) that audio subsystem 208 uses to generate an output sound. In alternative embodiments, processing subsystem 202 provides a digital signal that audio subsystem 208 decodes or otherwise processes to generate one or more signals for generating an output sound.

Within assistive-listening device 200, processing subsystem 202, memory subsystem 204, and networking subsystem 206 are coupled together using bus 210, and processing subsystem 202 and audio subsystem 208 are coupled together using bus 212. Bus 210 is an electrical connection that processing subsystem 202, memory subsystem 204, and networking subsystem 206 can use to communicate commands and data to each other, and bus 212 is an electrical connection that processing subsystem 202 and audio subsystem 208 can use to communicate commands and data to each other. Although busses 210 and 212 are shown for clarity, different embodiments can include a different number and/or configuration of electrical connections. Generally, assistive-listening device 200 comprises sufficient electrical connections to enable processing subsystem 202, memory subsystem 204, networking subsystem 206, and audio subsystem 208 to communicate with one another as necessary.

Assistive-listening device 200 can be, or can be incorporated into, many different types of electronic devices. Generally, these electronic devices include any device that a person can use to assist with the perception of sound. For example, assistive-listening device 200 can be a hearing aid, a cochlear implant, a vibrating device, a speaker, a headphone (or a pair of headphones), a display device, a tactile device, and/or another device.

Although we use specific components to describe assistive-listening device 200, in alternative embodiments, different components and/or subsystems may be present in assistive-listening device 200. For example, assistive-listening device 200 may include one or more additional processing subsystems 202, memory subsystems 204, and/or networking subsystems 206. Alternatively, one or more of the subsystems may not be present in assistive-listening device 200. Moreover, although separate subsystems are shown in FIG. 2, in some embodiments, some or all of a given subsystem can be integrated into one or more of the other subsystems in assistive-listening device 200.

In some embodiments, assistive-listening device 200 may include one or more additional subsystems that are not shown in FIG. 2. For example, assistive-listening device 200 can include, but is not limited to, a data collection subsystem, a display subsystem, and/or an input/output (I/O) subsystem. In some embodiments, assistive-listening device 200 includes one or more batteries (not shown) that provide power for assistive-listening device 200.

In some embodiments, assistive-listening device 200 can be a low-power device. In these embodiments, some or all of processing subsystem 202, memory subsystem 204, networking subsystem 206, and audio subsystem 208 can be configured as low-power mechanisms. For example, processing subsystem 202 can be a low-power processing mechanism and/or a processing mechanism with limited functionality. Moreover, in some embodiments, processing subsystem 202, memory subsystem 204, networking subsystem 206, and audio subsystem 208 can be custom-built to perform the indicated functions (processing, storing instructions and/or data, etc.) in assistive-listening device 200, e.g., can be custom ASICs.

In some embodiments, assistive-listening device 200 is worn or otherwise carried by a user (not shown) and provides assistance to the user in perceiving selected sound(s). For example, assistive-listening device 200 can be worn or implanted in the ear as a hearing aid and/or can be worn as a headphone or headphones with the appropriate mounting hardware (straps, frames, adhesives, fasteners, etc.), can be carried in hand or worn on the body, and/or can otherwise be made available to the user.

Figure 3:
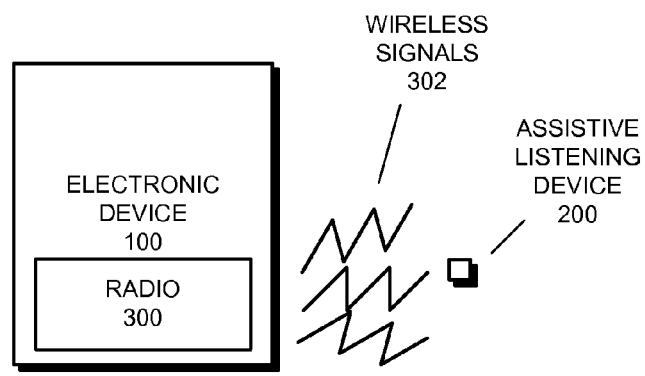
FIG. 3 presents a block diagram illustrating a system in accordance with the described embodiments.

FIG. 3 presents a block diagram illustrating a system in accordance with the described embodiments. As can be seen in FIG. 3, wireless signals 302 are transmitted from a radio 300 (e.g., in networking subsystem 106) in electronic device 100. Wireless signals 302 are received by the corresponding network interface in networking subsystem 206 in assistive-listening device 200 and processed by networking subsystem 206 and/or processing subsystem 202 in assistive-listening device 200. Although not shown in FIG. 3, wireless signals can also be transmitted from a radio in assistive-listening device 200 and received by radio 300 (or another radio in electronic device 100). Generally, sufficient wireless signals are communicated between electronic device 100 and assistive-listening device 200 to enable the formation and maintenance of a BTLE network connection and the communication of data (e.g., audio data) between electronic device 100 and assistive-listening device 200.

Note that although we describe embodiments using assistive-listening device 200, alternative embodiments use two electronic devices 100 and/or other devices. Generally, the described embodiments can use any pair of devices where one device is a transmitter of audio data and the other device is a receiver of audio data. In addition, in some embodiments, two separate connections can be established with electronic device 100 if a user has two assistive-listening devices 200 (e.g., one for each ear).

Data Channel Protocol Data Unit (PDU)

Figure 4:
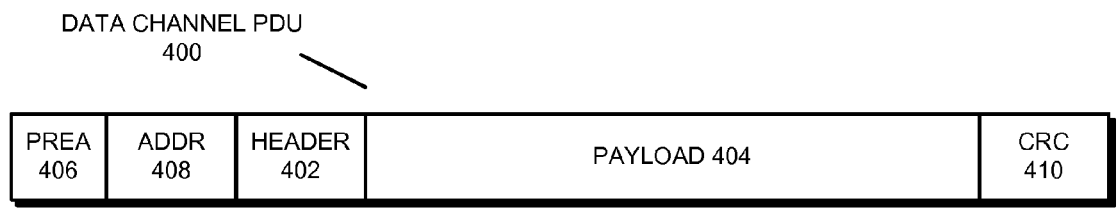
FIG. 4 presents a block diagram illustrating an exemplary data channel PDU in accordance with the described embodiments.

FIG. 4 presents a block diagram illustrating an exemplary data channel PDU 400 in accordance with the described embodiments. As shown in FIG. 4, data channel PDU 400 comprises header 402 and payload 404, in addition to preamble (PREA 406), access address (ADDR 408), and CRC 410. In the described embodiments, a field in header 402 is used to indicate whether payload 404 contains audio data (or contains some other data). More generally, with the exception of the uses herein described, the fields in data channel PDU 400 are used as described in the BTLE specification.

Figure 5:
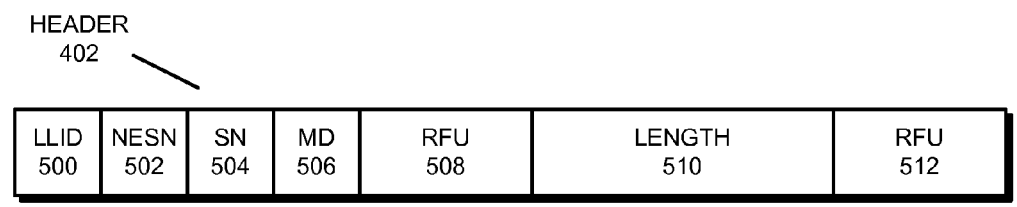
FIG. 5 presents a block diagram illustrating an expanded view of a header for a data channel PDU in accordance with the described embodiments.

FIG. 5 presents a block diagram illustrating an expanded view of a header 402 for a data channel PDU 400 in accordance with the described embodiments. As can be seen in FIG. 5, header 402 comprises the following fields: LLID 500, NESN 502, SN 504, MD 506, RFU 508, LENGTH 510, and RFU 512. These fields are generally similar to data channel PDU header fields that are known in the art and hence their functions (aside from the functions herein described) are not described in detail.

Unlike the existing BTLE standard, in some embodiments, the LLID 500 field can be used to indicate whether payload 404 of data channel PDU 400 contains audio data. The LLID 500 field is a two-bit field that is used in existing implementations of the BTLE standard to indicate whether the PDU is an LL data PDU or an LL control PDU. Because only 3 combinations of the two-bit LLID 500 field are used in making this indication, the described embodiments employ a previously-unused combination of the bits of the LLID 500 field (i.e., combination "00") to indicate that payload 404 contains audio data. Thus, in these embodiments, the type of data channel PDU 400 can be indicated as follows using the possible combinations in the LLID 500 field:

00—Audio data;
01—LL data PDU;
10—LL data PDU; or
11—LL control PDU.

When the LLID 500 field is set to 00, thereby indicating that audio data is present in payload 404, the logical link 604 layer (see FIG. 6) in protocol stack 600 can forward data from payload 404 to the audio 612 layer for processing. Note that forwarding payload 404 to audio 612 layer is an operation that was previously not possible in implementations of the BTLE standard both because there was no audio 612 layer, and because the 00 value of the LLID 500 field was unused.

Note that, although we describe header 402 using the illustrated fields, in some embodiments, header 402 contains a different number, arrangement, and/or type of fields. Generally, header 402 contains sufficient data for a receiving device (e.g., assistive-listening device 200) to determine whether or not the payload of the PDU contains audio data.

In some embodiments, when data channel PDU 400 contains audio data, the entire payload 404 can be audio data. That is, there may be no header or other information for audio 612 layer in payload 404. Because this is true, these embodiments can increase the amount of audio data that is included in a given data channel PDU 400, thereby reducing the amount of BTLE network traffic required to transfer the audio data and/or increasing the amount of audio data that can be transferred in a given amount of time (which can mean that the audio quality can be improved). In addition, the some embodiments can use the maximum number of bits (i.e., the maximum payload size) allowed for a payload when transmitting audio data. For example, in some embodiments the maximum payload size is 31 octets of audio data (note that the LENGTH 510 field in header 402 can indicate a length/number of octets in payload 404).

Protocol Stacks

In the described embodiments, electronic device 100 includes one or more protocol stacks that are used to manage the transfer of data to and from electronic device 100 using an appropriate interface in networking subsystem 106. For example, an operating system (not shown) executing on electronic device 100 can include software mechanisms that manage the transfer of data to and from the network interfaces in networking subsystem 106 for applications executing on electronic device 100. Each of the protocol stacks included in electronic device 100 includes a number of logical layers. For example, electronic device 100 can maintain a BTC/BTLE protocol stack that comprises a physical RF layer, a baseband (BB) layer, a link (LL) layer, an L2CAP layer, etc. At each layer of a given protocol stack, electronic device 100 includes hardware and/or software mechanisms for performing the functions associated with the layer.

Assistive-listening device 200 also includes one or more protocol stacks that are used to manage the transfer of data to and from assistive-listening device 200 using an appropriate interface in networking subsystem 206. For example, an operating system, a controller, and/or firmware (not shown) executing on assistive-listening device 200 can include software mechanisms that manage the transfer of data to and from the network interfaces in networking subsystem 206 for applications executing on assistive-listening device 200 and/or for other hardware mechanisms (e.g., an audio data processor and/or digital-to-analog converter) in assistive-listening device 200.

Figure 6:
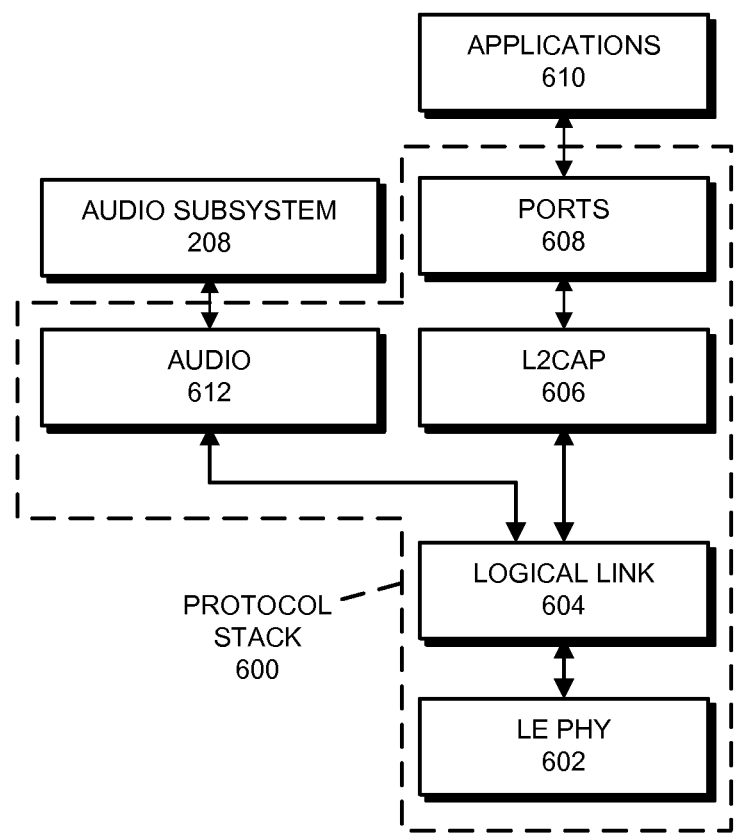
FIG. 6 presents a block diagram of a Bluetooth Low Energy protocol stack in accordance with the described embodiments.

FIG. 6 presents a block diagram of a BTLE protocol stack 600 in assistive-listening device 200 in accordance with the described embodiments. Note that protocol stack 600 shown in FIG. 6 differs from existing BTLE protocol stacks because protocol stack 600 includes the audio 612 layer, and can therefore handle audio data, as is herein described.

As can be seen in FIG. 6, protocol stack 600 comprises a number of different hardware and software mechanisms, including the LE PHY 602 layer, which is the physical/hardware layer of the BTLE protocol stack, and the logical link 604 and L2CAP 606 layers, that are implemented in software/firmware (e.g., executed by processing subsystem 202 and/or networking subsystem 206). Protocol stack 600 also includes ports 608, which serve as interfaces between protocol stack 600 and applications 610 executing on assistive-listening device 200. (Note that the "applications 610" may simply be functions of the operating system/firmware/controller in assistive-listening device 200, and may not be standalone applications such as in more complex electronic devices). Aside from the functions herein described, the functions performed by the layers of protocol stack 600 are generally known in the art and hence are not described.

Differently than existing BTLE protocol stacks, protocol stack 600 includes the audio 612 layer. The audio 612 layer is a software mechanism executed by processing subsystem 202 that is configured to process incoming audio data. Generally, the logical link 604 layer reads incoming data channel PDUs 400 to determine if the data channel PDUs 400 contain audio data, and, if not, logical link 604 layer can process data channel PDU 400 accordingly. Otherwise, if the data channel PDUs 400 contain audio data, logical link 604 layer can forward data in payload 404 from the data channel PDU 400s to audio 612 layer for subsequent processing (e.g., as an audio stream). The subsequent processing is described in more detail below.

In some embodiments, the network protocol stacks in electronic device 100 and assistive-listening device 200 provide applications on electronic device 100 and assistive-listening device 200 access to the attribute protocol (ATT) and generic attribute protocol (GATT), as are known in the art. In some of these embodiments, assistive-listening device 200 can function as a GATT server, and electronic device 100 can function as a GATT client and can access (read, write, modify) data in assistive-listening device 200.

In some embodiments, device discovery and connection establishment between electronic device 100 and assistive-listening device 200 follows the BTLE specification. In some of these embodiments, electronic device 100 can take on the role of "central" and assistive-listening device 200 the role of "peripheral." For example, assistive-listening device 200 can send an advertisement PDU with advertisement data periodically using an advertising interval of N seconds (e.g., 1-5 seconds), with a UUID for assistive-listening device 200 included in the advertising data.

Audio Subsystem

Figure 7:
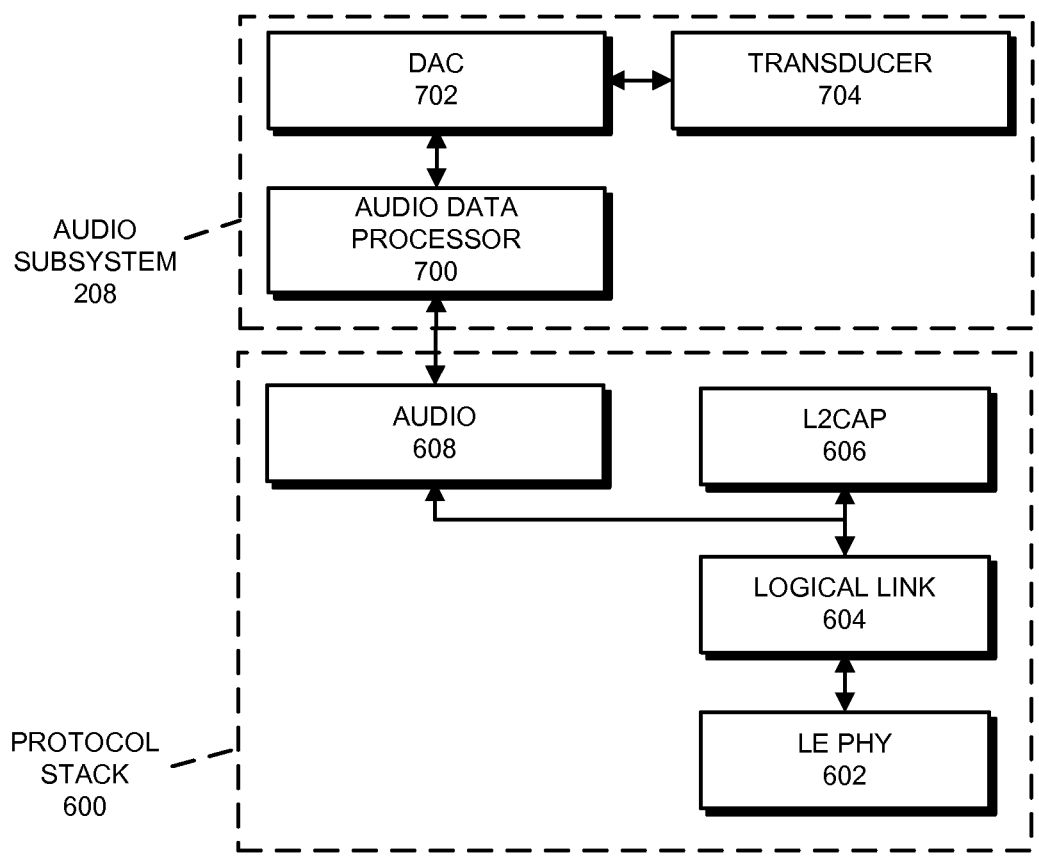
FIG. 7 presents a block diagram illustrating an audio subsystem in accordance with the described embodiments.

FIG. 7 presents a block diagram illustrating audio subsystem 208 in assistive-listening device 200 in accordance with the described embodiments. As can be seen in FIG. 7, audio subsystem 208 comprises an audio data processor 700, a digital-to-analog converter (DAC) 702, and a transducer 704. Audio data processor 700 is configured to perform operations to generate processed digital data from data received from audio 612 layer. The processed digital data is then forwarded from audio data processor 700 to DAC 702, where an analog signal is generated from the processed digital data. The analog signal is sent to transducer 704 for generation of signals (sound, vibrations, etc.) that can be perceived as sound by a user of assistive-listening device 200.

In the described embodiments, in electronic device 100, audio data can be compressed, encoded, and/or otherwise processed before a data channel PDU 400 is generated from the audio data. For example, in some embodiments, the processing can be performed to reduce the overall bit-length/size of the audio data to enable the audio data to be transmitted in as few data channel PDUs 400 as possible, while still maintaining a predetermined audio quality level (here, "quality level" is defined as an ability of a listener to perceive given aspects of an output audio signal generated from the audio data). In some embodiments, the processing comprises G.711, G. 722, G.722.1, and/or G. 726 encoding, MP3 encoding, and/or AAC-ELD encoding.

Because audio data received from electronic device 100 is encoded, compressed, and/or otherwise processed, audio data processor 700 can perform one or more operations to restore the audio signal from the received audio data and/or process the received audio data. For example, audio data processor 700 can decode, transcode, convert, amplify, normalize, shape, attenuate, reconfigure, customize, and/or otherwise process the audio data. In some embodiments, this processing includes G.711/G.726/G.722/G.722.1 decoding, MP3 decoding, and/or AAC decoding.

Transducer 704 generally comprises any device or combination of devices that can output a signal that can be perceived as a sound and/or as a proxy for sound by a person using assistive-listening device 200. For example, transducer 704 can be a speaker, a vibrator, an electrical signal generator, a visual signal generator, a tactile signal generator, and/or another device that can output sound, electrical, vibration, visual, tactile, and/or other types of signals.

Although an arrangement of functional blocks is shown in FIG. 7, in some embodiments, some or all of the functional blocks are included in other functional blocks and/or are included elsewhere in assistive-listening device 200. For example, audio data processor 700 and/or DAC 702 can be included in the audio 612 layer of the protocol stack. Moreover, in some embodiments, some or all of audio subsystem 208 can be included in processing subsystem 202 and/or networking subsystem 206, i.e., the functions being described as being performed by audio subsystem 208 can be performed by general-purpose circuits in processing subsystem 202 when processing subsystem 202 executes program code and/or firmware.

Communication Between Devices

Figure 8:
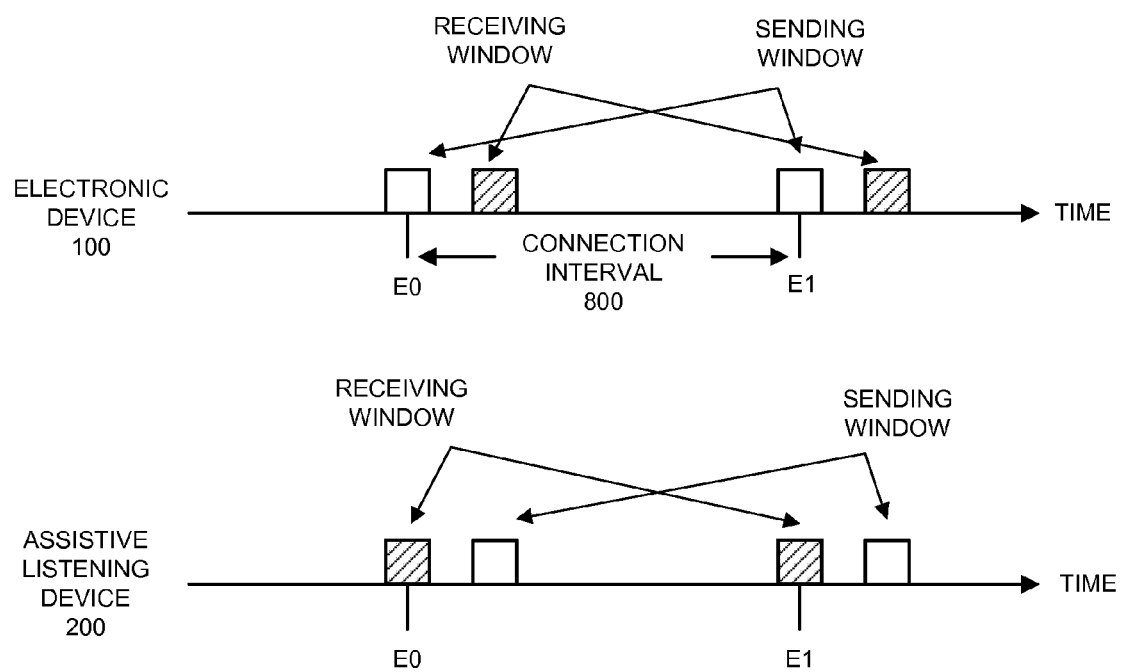
FIG. 8 presents a timeline diagram of communication between devices in accordance with the described embodiments.

FIG. 8 presents a timeline diagram of communication between devices in accordance with the described embodiments. More specifically, FIG. 8 presents a timeline diagram of communications between electronic device 100 and assistive-listening device 200. The communication shown in FIG. 8 occurs after a BTLE network connection has been established between electronic device 100 and assistive-listening device 200 using techniques known in the art.

FIG. 8 includes a timeline that proceeds from left to right. The timeline shows a series of "events" at predetermined times, including event zero ("E0") and event one ("E1"). During each event, electronic device 100 and assistive-listening device 200 can be prepared either to send (shown as a "sending window" in FIG. 8) or receive (shown as a "receiving window" in FIG. 8) a communication using the BTLE network connection. For example, at E0, electronic device 100 can send communications to assistive-listening device 200, and assistive-listening device 200 can receive communications sent by electronic device 100. Thus, if electronic device 100 has data to communicate to assistive-listening device 200 at the time of E0, electronic device 100 can send a data channel PDU 400 to assistive-listening device 200 with the data at the time of E0 (and can expect that assistive-listening device 200 should be receiving). The same is true for assistive-listening device 200, except the exemplary sending window for assistive-listening device 200 may be at a different time than the sending window for electronic device 100 to enable the radios in electronic device 100 and assistive-listening device 200 to be configured accordingly.

Note that, although we present illustrative sending/receiving windows, in alternative embodiments, other sending/receiving windows can be used. Additionally, more than one communication (i.e., two more PDUs) can be sent/received starting from a given event. For example, a sending device can send a communication during the sending device's sending window, followed by a response acknowledging the receipt of the communication from the receiving device, and then the sending device can immediately send (and perhaps receive) additional communications. The sending of communications based on an event is generally known in the art and hence is not described in detail.

Additionally, in some embodiments, each PDU sent during a given sending window that is not acknowledged by the receiving device before the next sending window starts can be flushed from the sending device (i.e., can be discarded) at the next event/start of a sending window. In these embodiments, data packets may therefore only be sent during one sending window.

In the described embodiments, connection interval 800 can be a predetermined length of time (and hence the events occur at a predetermined interval). For example, connection interval 800 can be 1 second long, 3 seconds long, etc. (or, more generally, any connection interval that is allowable in accordance with the BTLE standard).

In the described embodiments, the length of connection interval 800 can be dynamically set (i.e., set while electronic device 100 and assistive-listening device 200 are operating) to place the electronic device 100 and assistive-listening device 200 in a given mode. For example, in some embodiments, electronic device 100 and assistive-listening device 200 can operate in two modes, an active communication mode and a resting mode. During the resting mode, connection interval 800 can be a longer interval, e.g., 1 s, 2 s, etc., and during the active communication mode, connection interval 800 can be a shorter interval, e.g., 8 ms, 12 ms, 1 s, etc. These modes can be automatically configured (e.g., can be entered or exited at a given time or upon a predetermined event happening) and/or can be configured using the process described below with respect to FIG. 9.

Generally, during the active communication mode, connection interval 800 is configured to enable electronic device 100 and assistive-listening device 200 to communicate data (e.g., audio data, control/configuration data, and/or other data) at a predetermined rate. For example, if a bit-rate of N bits per second is to be used to transfer data, and a payload 404 of each data channel PDU 400 is at most K bits long, connection interval 800 can be set accordingly.

During the resting mode, connection interval 800 is configured to enable electronic device 100 and assistive-listening device 200 to consume less power than in the active communication mode, while still being sufficiently responsive to begin higher-speed communication data between electronic device 100 and assistive-listening device 200 when data becomes available. For example, assuming that electronic device 100 is a phone and assistive-listening device 200 is a hearing-aid, in the resting mode, connection interval 800 should be a short enough time to enable electronic device 100 and assistive-listening device 200 to respond in time to answer the phone call. More specifically, an event should happen sufficiently often to enable electronic device 100 to communicate to assistive-listening device 200 that the active communication mode is to be entered so that the phone call can be answered in a reasonable time (e.g., 1 second, 2 seconds, etc.).

Configuration

As indicated above with respect to connection interval 800, the described embodiments can dynamically configure aspects of the communication between electronic device 100 and assistive-listening device 200 and/or of the processing of data in electronic device 100 and assistive-listening device 200. For example, in addition to connection interval 800, in some embodiments, electronic device 100 and assistive-listening device 200 can configure the type of processing that is performed on the audio data that is communicated between electronic device 100 and assistive-listening device 200. In these embodiments, the processing can include any of the above-described compression, encoding, transcoding converting, amplifying, normalizing, shaping, attenuating, reconfiguring, customizing, etc. The described embodiments can also configure other aspects, such as channels used, signal strengths, sending/receiving window length, etc.

For example, in some embodiments, electronic device 100 and assistive-listening device 200 can exchange data channel PDUs 400 to configure connection interval 800 as described above. In these embodiments, while operating in the active communication mode at runtime, electronic device 100 can determine that limited or no data is likely to be sent to assistive-listening device 200 for a given amount of time (e.g., 10 seconds, 1 minute, etc.), and can send a data channel PDU 400 at an appropriate event time to cause assistive-listening device 200 to enter the rest mode. Upon subsequently determining that data is to be sent to assistive-listening device 200, electronic device 100 can send another data channel PDU 400 at an appropriate event time to cause assistive-listening device 200 to enter the active communications mode. When entering either mode, assistive-listening device 200 and electronic device 100 begin using the corresponding connection interval 800. Note that, in some embodiments, the data channel PDU 400 in this example may be consumed/read at the logical link 604 layer and used to configure lower layers of protocol stack 600 (e.g., the radios, etc.).

As another example, in some embodiments, as one of the initial operations when preparing to communicate audio data, assistive-listening device 200 can send a data channel PDU 400 to electronic device 100 with a payload that indicates a type (or types) of audio processing that is (are) supported by audio data processor 700. For example, assistive-listening device 200 can indicate what types of audio data decoding are supported. Electronic device 100 can then configure its audio processing accordingly, and, if assistive-listening device 200 supports multiple types of audio processing, e.g., multiple types of decoders, can indicate in a data channel PDU 400 to assistive-listening device 200 which data processing will be used. In this way, audio data processing aspects are configured before communication of audio data begins. Because configuration data need not be carried in the data stream after the initial configuration operations are completed, subsequent communication can include a larger proportion of audio data per payload (than systems that include configurations with audio data PDUs).

In some embodiments, when configuring the decoders (or "codecs") that are to be used, electronic device 100 (the audio "source"—which can be the "master" on the BTLE link) can start by sending a prioritized list of codecs supported by electronic device 100 in a dedicated configuration PDU (a prioritized_supported_codec_list PDU) to assistive-listening device 200 (the audio "sink"—which can be the "slave" on the BTLE link). Assistive-listening device 200 can then respond to electronic device 100 with a prioritized list of codecs supported by assistive-listening device 200 using a prioritized_supported_codec_list PDU. Electronic device 100 next decides what codec to use and sends a confirmation configuration PDU (a select_codec PDU). (Note that, although we describe this exchange, some embodiments only perform a one-sided exchange during which a configuration PDU is sent from assistive-listening device 200 to electronic device 100 to enable electronic device 100 to determine the codecs supported by assistive-listening device 200, one of which can be selected by electronic device 100.)

In some embodiments, in the prioritized_supported_codec_list PDU, each codec can be numerically represented by a predetermined numeric codec ID (CoID) that is a predetermined fixed length. For example, in some embodiments, the CoID can be one octet in length, two octets in length, etc. In some embodiments, a maximum of N CoIDs (e.g., 22, 28, etc.) may be sent in a prioritized_supported_codec_list PDU. If more than N codecs are supported by a given device, a last octet in the prioritized_supported_codec_list PDU can be set to a predetermined value (e.g., 0, 255, etc.) to indicate that more codecs are supported. A subsequent prioritized_supported_codec_list PDU can then be sent with the remaining codecs—an operation that can be repeated until all supported codecs have been communicated from one device to the other.

In some embodiments, within a prioritized_supported_codec_list PDU, the codecs can be ordered in priority or preference order by the sender. For example, assuming a CoID of one octet, a first octet in a prioritized_supported_codec_list can contain the codec that the sender would most prefer using. The second octet, the sender's second choice and so on. In some embodiments, the prioritized_supported_codec_list PDU sent by assistive-listening device 200 can be ordered in accordance with the listing of the codecs in the prioritized_supported_codec_list PDU sent from electronic device 100 (i.e., assistive-listening device 200 can attempt to match the list to the extent possible, etc.).

In some embodiments, the select_codec PDU can comprise an octet (or octets) that list the CoID of the codec to be used (e.g., the codec selected by electronic device 100). The select_codec PDU may also comprise additional codec-specific parameters.

As described herein, the codec may be changed during a communication session (i.e., while electronic device 100 and assistive-listening device 200 are communicating using a BTLE link). For example, in some embodiments, electronic device 100 can determine that a different codec from the list of codecs previously described by assistive-listening device 200 in a prioritized_supported_codec_list PDU is to be used. Before the different codec is used, electronic device 100 can send a PDU indicating that the audio stream is to be stopped, then send a select_codec PDU indicating the new codec to be used, and next restart the audio stream using the new codec. Note that, in some embodiments, assistive-listening device 200 may acknowledge the new codec before electronic device 100 starts using the codec.

In another example of the configuration that can be performed, in some embodiments, electronic device 100 can configure aspects of the signals (sound, vibrations, light, etc.) that are output from transducer 704 in assistive-listening device 200. In these embodiments, electronic device 100 can communicate data channel PDUs 400 to assistive-listening device 200 indicating that the signals that are output from transducer 704 should be modified in some way, including the above-described amplifying, normalizing, shaping, attenuating, reconfiguring, customizing, etc. In some of these embodiments, one or more applications 610 on assistive-listening device 200 can receive the payloads 404 from the data channel PDUs 400 communicated from electronic device 100 (e.g., from the L2CAP 606 layer through ports 608), and can configure the audio 612 layer in protocol stack 600 and/or audio subsystem 208 to modify the signals output from transducer 704.

In some of these embodiments, electronic device 100 can be configured to recognize when the signals that are output from transducer 704 should be modified in some way, and can be configured to communicate the modification to assistive-listening device 200. In other embodiments, electronic device 100 can execute an application that provides a user interface that allows a local and/or remote user to configure the sound output from assistive-listening device 200. For example, in some embodiments, a person can remotely log-in to electronic device 100 and use the interface to adjust the sound output by assistive-listening device 200 (where assistive-listening device 200 is a hearing aid).

Note that the described embodiments are not limited to configuration as an initial operation. In these embodiments, configuration is performed anytime, as necessary; including reconfiguration. Moreover, although we describe the prioritized_supported_codec_list PDU and the select_codec PDU as separate PDUs, in some embodiments, a dedicated, but generic configuration PDU is used for multiple operations, with a code set in the PDU for different functions. For example, along with codes for prioritized_supported_codec_list and select_codec, the configuration PDU can include codes for "start stream" and "stop stream" which indicate that the audio stream from the source (e.g., electronic device 100) is to be started or stopped, "version," etc.

Figure 9:
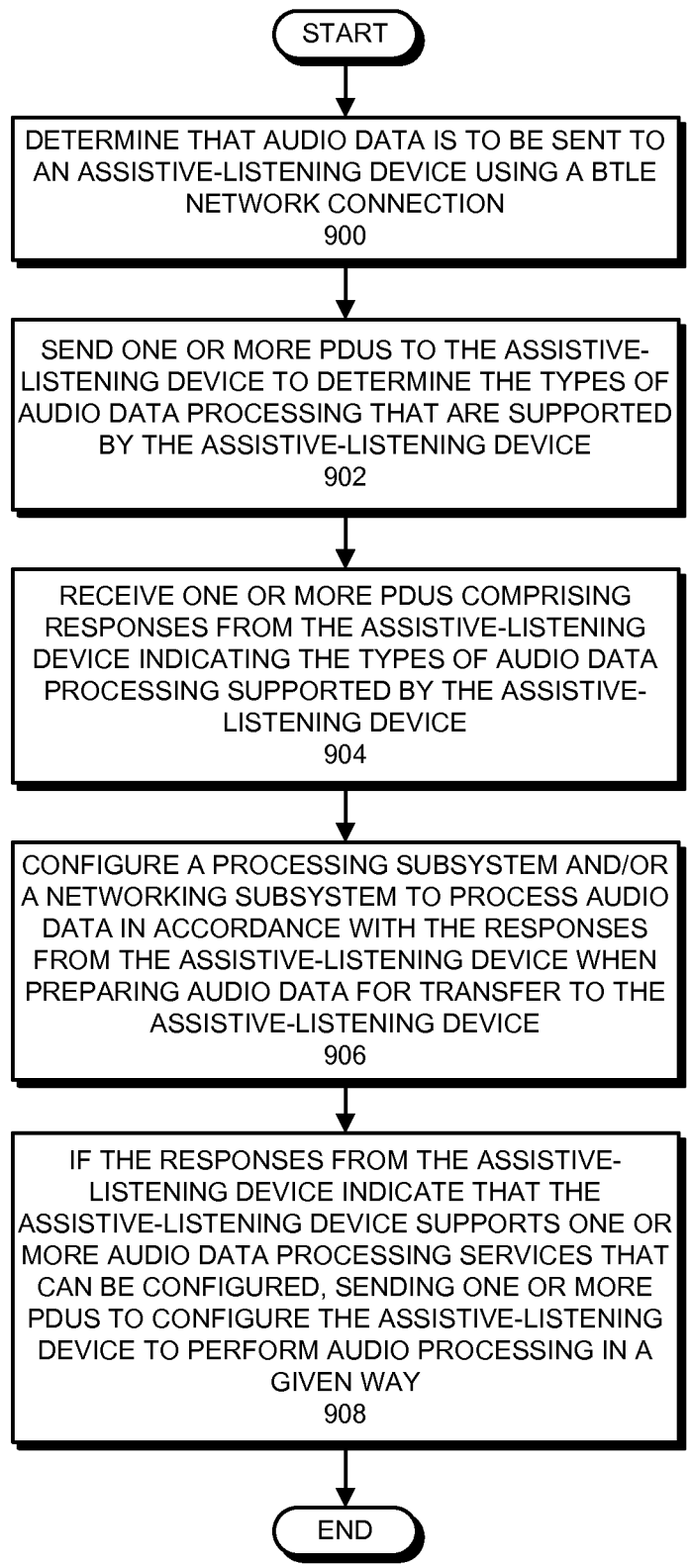
FIG. 9 presents a flowchart that illustrates a process for configuring an electronic device and an assistive-listening device for communicating audio in accordance with the described embodiments.

FIG. 9 presents a flowchart that illustrates a process for configuring electronic device 100 and assistive-listening device 200 for communicating audio data in accordance with the described embodiments. For this example, it is assumed that a BTLE network connection was previously established. Note that, although we use the operations shown in FIG. 9 to describe the process, in alternative embodiments, the operations may be performed in a different order and/or more or fewer operations may be performed for configuring electronic device 100 and assistive-listening device 200 for communicating audio data.

As can be seen, the process in FIG. 9 starts when electronic device 100 determines that audio data is to be sent to assistive-listening device 200 using a BTLE network connection (step 900). For example, an operating system in electronic device 100 can receive a request from an application to begin transferring audio data on the BTLE network connection or can otherwise determine that audio data is to be sent to assistive-listening device 200. Electronic device 100 then sends one or more data channel PDUs 400 to assistive-listening device 200 to determine the types of audio data processing that are supported by assistive-listening device 200 (step 902). For example, electronic device 100 can send one or more requests to determine an audio decoder, an audio converter, an amplifier, an equalizer, and/or other types of audio processing provided by assistive-listening device 200. In some embodiment, each data channel PDU 400 sent by electronic device 100 comprises one request (e.g., a request for types of decoders in assistive-listening device 200). In alternative embodiments, electronic device 100 can send one or more compound requests to determine the types of audio data processing supported by assistive-listening device 200 (e.g., a single request for all types of data processing supported by assistive-listening device 200).

Next, electronic device 100 receives one or more data channel PDUs 400 that comprise responses from assistive-listening device 200 indicating the types of audio data processing that are supported by assistive-listening device 200 (step 904). For example, electronic device 100 can receive one or more responses indicating that assistive-listening device 200 includes an AAC decoder and a particular type of equalizer.

Electronic device 100 then configures processing subsystem 102 and/or networking subsystem 106 to process audio data in accordance with the responses from assistive-listening device 200 when preparing audio data for transfer to assistive-listening device 200 (step 906). For example, assuming that the responses from assistive-listening device 200 indicate that the above-described AAC decoder is included in assistive-listening device 200, electronic device 100 can configure processing subsystem 102 (or another mechanism in electronic device 100) to encode audio data using the AAC encoding scheme.

Depending on the type of processing supported by assistive-listening device 200, electronic device 100 may also subsequently send one or more data channel PDUs 400 to configure assistive-listening device 200 to perform audio processing in a given way (step 908). For example, assuming that assistive-listening device 200 indicates support for the above-described equalizer, electronic device 100 can send one or more data channel PDUs 400 to configure settings of the equalizer (e.g., to normalize the audio data in assistive-listening device 200, etc.).

Note that, when electronic device 100 sends data channel PDUs 400 to assistive-listening device 200, electronic device 100 can send any type of data channel PDUs 400 to assistive-listening device 200. For example, electronic device 100 can send data channel PDUs 400 that are read/consumed by the logical link 604 layer for configuring lower levels of protocol stack 600, can send data channel PDUs 400 that are read/consumed by the L2CAP 606 layer and forwarded to applications 610 for configuring assistive-listening device 200, etc. The same is true for response data channel PDUs sent from assistive-listening device 200 to electronic device 100.

In some embodiments, a user of an electronic device in communication with electronic device 100 (or another electronic device that is in communication with assistive-listening device 200) can use the above-described data channel PDUs 400 to configure one or more operations performed by assistive-listening device 200 when processing audio data (e.g., equalization, amplification, etc.). For example, an audiologist, a parent, and/or another entity (including possibly a second electronic device, e.g., a computer system) can determine that audio data is to be processed in assistive-listening device 200 in a particular way, and can use a configuration application or web interface (e.g., on a home computer and/or in a doctor's office) to send corresponding data channel PDUs 400 with configuration information to assistive-listening device 200 (perhaps through electronic device 100). This can include forming a network connection (Bluetooth, WiFi, PAN, etc.) with electronic device 100 from another electronic device, and using the herein-described mechanisms in electronic device 100 to communicate with assistive-listening device 200.

Figure 10:
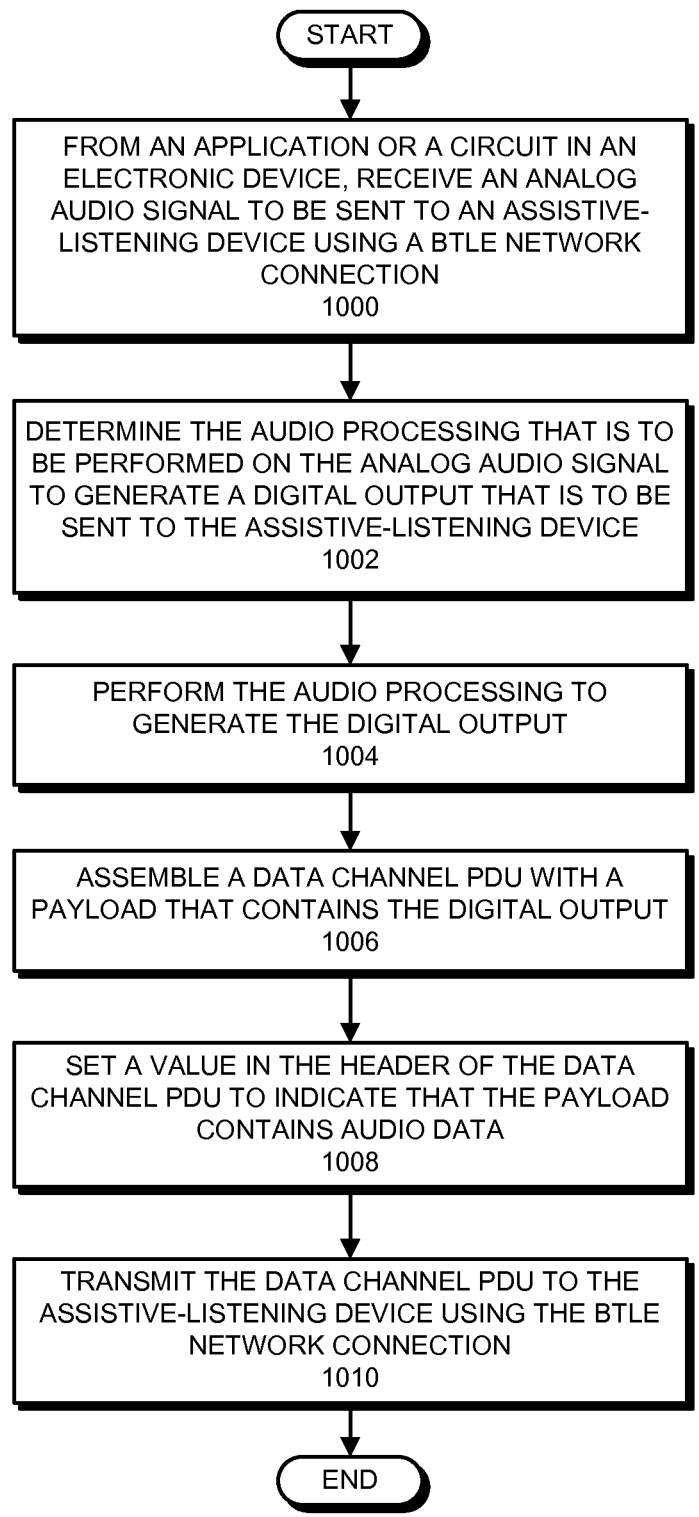
FIG. 10 presents a flowchart illustrating a process for sending audio data from an electronic device using a BTLE network connection in accordance with the described embodiments.
Figure 11:
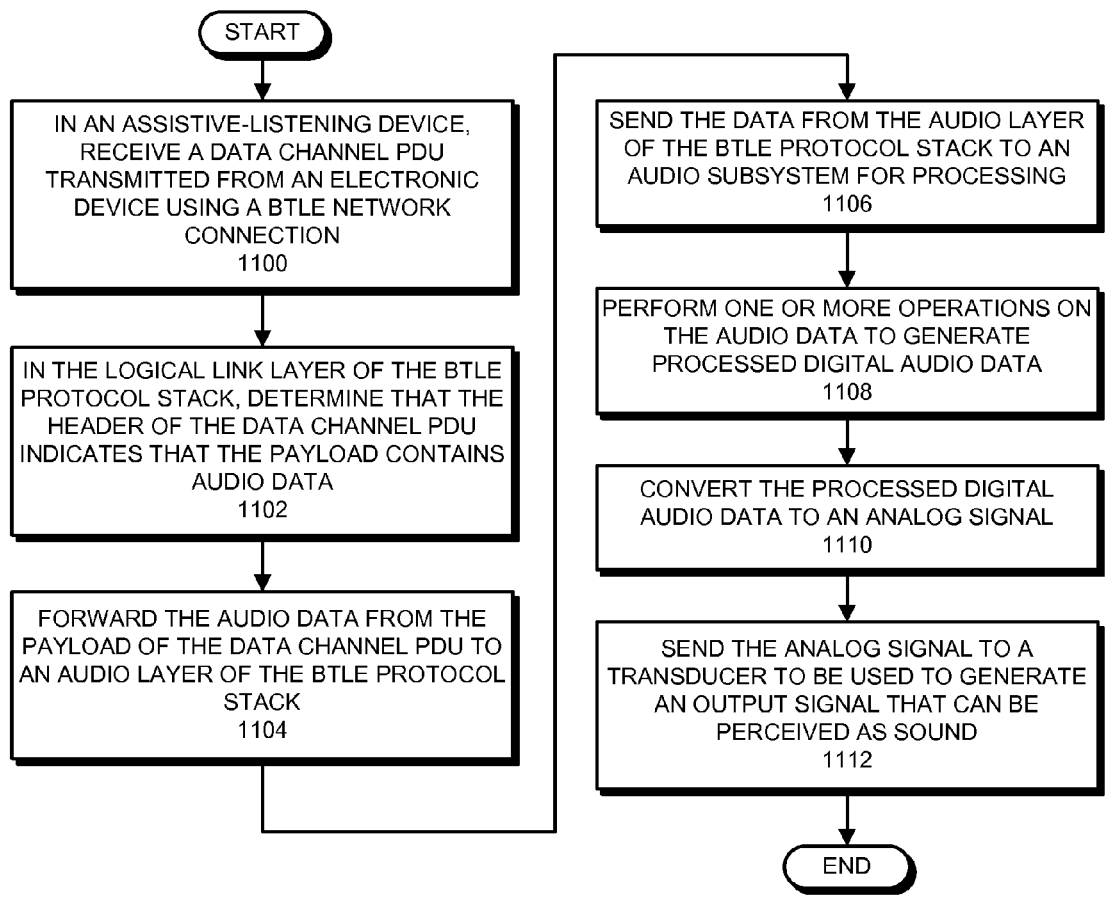
FIG. 11 presents a flowchart illustrating a process for receiving audio data in an assistive-listening device using the BTLE network connection in accordance with the described embodiments.

Sending and Receiving Audio Data Using the Bluetooth Low Energy Network Connection FIG. 10 presents a flowchart illustrating a process for sending audio data using a BTLE network connection from an electronic device 100 in accordance with the described embodiments. FIG. 11 presents a flowchart illustrating a process for receiving audio data using the BTLE network connection in an assistive-listening device 200 in accordance with the described embodiments. For this example, it is assumed that the BTLE network connection was previously established and that the configuration operations described in FIG. 9 have been performed. Although we use the operations shown in FIG. 10-11 to describe these processes, in alternative embodiments, the operations may be performed in a different order and/or more or fewer operations may be performed.

Although we describe the configuration operations as having already been performed, in the described embodiments, configuration and audio data PDUs can be mixed, so that configuration PDUs are interleaved with audio PDUs, thereby enabling the dynamic re-configuration of assistive-listening device 200 and/or electronic device 100. In some embodiments, the interleaved PDUs can contain information (e.g., sequence number bits, etc.) in header 402 that indicates that the PDUs are related to the processing of audio.

The process shown in FIG. 10 starts when an application being executed by electronic device 100 or a circuit in electronic device 100 generates an analog audio signal to be sent to assistive-listening device 200 using the BTLE network connection (step 1000). Electronic device 100 then determines the audio processing that is to be performed on the analog audio signal to generate a digital output that is to be sent to assistive-listening device 200 (step 1002). As described above, this operation can involve determining which audio decoder, audio converter, amplifier, equalizer, and/or other type of audio processing are provided by assistive-listening device 200, as indicated by one or more configuration settings in electronic device 100.

Upon determining the audio processing that is to be performed on the analog audio signal, electronic device 100 performs the audio processing to generate the digital output (step 1004). Electronic device 100 then assembles a data channel PDU 400 with a payload 404 that contains the digital output (step 1006), and sets a value in a header 402 of the data channel PDU 400 to indicate that the payload 404 contains audio data (step 1008). In the described embodiments, the audio processing and the assembly of the data channel PDU 400 can occur in different applications, layers of the protocol stack, etc. For example, in some embodiments, encoded audio data coming from a codec in electronic device 100 is treated as a stream and directly fed to the link layer (LL) of the Bluetooth protocol stack in electronic device 100. The link layer (LL) can treat the stream as a real time stream (e.g., may flush data from this stream in case of link congestion, etc.).

Next, the electronic device 100 transmits the data channel PDU to the assistive-listening device 200 using the BTLE network connection (step 1010). Note that the data channel PDU is transmitted from electronic device 100 upon the occurrence of a corresponding event (see FIG. 8), so that electronic device 100 is in a sending window, and is therefore permitted to transmit packets to assistive-listening device 200 using the BTLE network connection, and assistive-listening device 200 is in a receiving window, and is therefore listening for packets from electronic device 100 on the BTLE network connection. In some embodiments, the devices are in the active communication mode and the connection interval is configured accordingly.

The process shown in FIG. 11 starts when assistive-listening device 200 receives the data channel PDU 400 transmitted from electronic device 100 using the BTLE network connection (step 1100). In the logical link 604 layer of BTLE protocol stack 600, assistive-listening device 200 determines that the header 402 of the data channel PDU 400 indicates that the payload 404 of the data channel PDU 400 contains audio data (step 1102). For example, the logical link 604 layer can read the header of the packet to determine if a predetermined field in the header 402 of the data channel PDU 400 indicates that the payload 404 contains audio data. In some embodiments, this can comprise reading the LLID to determine if the LLID is set to a predetermined value, e.g., 00.

Upon determining that the data channel PDU 400 contains audio data, the logical link 604 layer forwards the audio data from the payload 404 to an audio 612 layer of the BTLE protocol stack (step 1104). Note that, in some embodiments, the entire payload 404 of the data channel PDU 400 is forwarded from the logical link 604 layer to the audio 612 layer. Audio 612 layer then sends the audio data to the appropriate part of an audio subsystem 208 for processing (step 1106). In audio subsystem 208, one or more operations are performed on the audio data from the payload 404 to generate processed digital audio data (step 1108). For example, the audio data from payload 404 can be decoded, transcoded, equalized, normalized, modified, and/or otherwise processed. The processed digital audio data is then forwarded to a DAC 702 to be converted to an analog signal (step 1110). From DAC 702, the analog signal is then sent to transducer to be used to generate an output signal that can be perceived as sound (step 1112).

Although we describe the processes in FIGS. 10-11 using electronic device 100 as the sending device and assistive-listening device 200 as the receiving device, in alternative embodiments, other combinations of devices can be used. For example, in some embodiments, two electronic devices 100 can perform the operations shown in FIGS. 10-11.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments.

What is claimed is:

1. A method, comprising:
   by a receiving electronic device comprising a Bluetooth Low Energy (BTLE) protocol stack, wherein the BLTE protocol stack comprises a link layer and an audio layer, the audio layer being located above the link layer within the BLTE protocol stack,
      receiving a data channel protocol data unit (PDU) in the link layer of the Bluetooth Low Energy protocol stack;
   by the link layer,
      determining, based at least in part on a value in an LLID field in a header of the data channel PDU, whether a payload of the data channel PDU comprises encoded audio;
      upon determining that the payload of the data channel PDU contains audio data, sending the audio data from the payload to the audio layer of the BTLE protocol stack for processing; and
   upon determining that the payload of the data channel PDU does not contain audio data, further processing the data channel PDU based at least in part on the value in the LLID field.

2. The method of claim 1, further comprising:
   from the audio layer, sending the audio data to an audio data processor in an audio subsystem in the receiving electronic device;
   in the audio data processor,
      performing one or more operations to generate processed digital audio data from the audio data; and
      performing one or more operations to generate an analog signal from the processed digital audio data.

3. The method of claim 2, wherein sending the audio data from the audio layer to the audio data processor comprises:
  determining one or more configuration settings in the receiving electronic device;
  based at least in part on one or more configuration settings, determining the one or more operations to be performed to generate processed digital audio data from the audio data; and
  based at least in part on one or more operations to be performed, sending the audio data from the audio layer to at least one corresponding processor in the audio data processor.

4. The method of claim 3, wherein determining the operations to be performed to generate processed digital audio data from the audio data comprises determining a type of decoder to be used to decode the audio data from the payload of the data channel PDU; and
  wherein sending the audio data from the audio layer to the corresponding processor comprises sending the audio data to the determined type of decoder for subsequent decoding.

5. The method of claim 2, wherein performing the one or more operations to generate the processed digital audio data comprises at least one of decompressing the audio data, decoding the audio data, or converting the audio data into a different format of audio data.

6. The method of claim 2, further comprising:
  outputting the analog signal to at least one transducer; and
  generating an output signal using the transducer.

7. The method of claim 1, wherein further processing the data channel PDU based at least in part on the value in the LLID field comprises:
  forwarding the data channel PDU to an L2CAP layer of the Bluetooth Low Energy (BTLE) protocol stack;
  upon determining that the data channel PDU is a configuration packet that includes information that one or more applications use in updating a configuration of at least one of the audio layer, an audio data processor in an audio subsystem, or an audio transducer, sending information from the data channel PDU to the one or more applications; and
  in the one or more applications, configuring at least one of the audio layer, the audio data processor in an audio subsystem, or the audio transducer in accordance with the information from the data channel PDU.

8. The method of claim 1, wherein further processing the data channel PDU based at least in part on the value in the LLID field comprises increasing or decreasing a connection interval in the BTLE protocol stack.

9. The method of claim 1, wherein the receiving electronic device is an assistive-listening device.

10. The method of claim 1, wherein the audio layer interfaces between the link layer of the BTLE protocol stack and an audio subsystem in the receiving electronic device, wherein the audio layer forwards data received from the link layer directly to the audio subsystem for subsequent processing.

11. The method of claim 1, wherein a length of the audio data is a maximum number of bits as indicated by a length field the header.

12. The method of claim 1, wherein the audio layer comprises an audio processor and a digital-to-analog converter.

13. An electronic device, comprising:
  a processing subsystem; and
  a networking subsystem;
  wherein the processing subsystem and the networking subsystem perform operations for:
    receiving a data channel protocol data unit (PDU) in a link layer of a Bluetooth Low Energy (BTLE) protocol stack, wherein the link layer is located above an audio layer of the BLTE protocol stack, the data channel PDU having been received from a smart phone;
    by the link layer,
      determining, based at least in part on a value in an LLID field in a header of the data channel PDU, whether a payload of the data channel PDU comprises encoded audio; and
      upon determining that the payload of the data channel PDU contains audio data, sending the audio data from the payload to the audio layer of the BTLE protocol stack for processing.

14. The electronic device of claim 13, wherein the processing subsystem and the networking subsystem further perform operations for:
  from the audio layer, sending the audio data to an audio data processor in an audio subsystem in the receiving electronic device;
  in the audio data processor,
    performing one or more operations to generate processed digital audio data from the audio data; and
    performing one or more operations to generate an analog signal from the processed digital audio data.

15. The electronic device of claim 14, wherein sending the audio data from the audio layer to the audio data processor comprises:
  determining one or more configuration settings in the receiving electronic device;
  based at least in part on one or more configuration settings, determining the one or more operations to be performed to generate processed digital audio data from the audio data; and
  based at least in part one or more operations to be performed, sending the audio data from the audio layer to at least one corresponding processor in the audio data processor.

16. The electronic device of claim 15, wherein determining the operations to be performed to generate processed digital audio data from the audio data comprises determining a type of decoder to be used to decode the audio data from the payload of the data channel PDU; and
  wherein sending the audio data from the audio layer to the corresponding processor comprises sending the audio data to the determined type of decoder for subsequent decoding.

17. The electronic device of claim 14, wherein performing the one or more operations to generate the processed digital audio data comprises at least one of decompressing the audio data, decoding the audio data, or converting the audio data into a different format of audio data.

18. The electronic device of claim 14, wherein the processing subsystem further performs operations for:
  outputting the analog signal to at least one transducer; and
  generating an output signal using the transducer.

19. The electronic device of claim 18, wherein the output signal is a signal that can be perceived as sound.

20. The electronic device of claim 13, wherein further processing the data channel PDU based at least in part on the value in the LLID field comprises, by the processing subsystem and the networking subsystem performing operations for:

forwarding the data channel PDU to an L2CAP layer of the Bluetooth Low Energy (BTLE) protocol stack;

upon determining that the data channel PDU is a configuration packet that includes information that one or more applications use in updating a configuration of at least one of the audio layer, an audio data processor in an audio subsystem, or an audio transducer, sending information from the data channel PDU to the one or more applications; and in the one or more applications, configuring at least one of the audio layer, the audio data processor in an audio subsystem, or the audio transducer in accordance with the information from the data channel PDU.

21. The electronic device of claim 13, wherein further processing the data channel PDU based at least in part on the value in the LLID field comprises increasing or decreasing a connection interval in the BTLE protocol stack.

22. The electronic device of claim 13, wherein the payload of the data channel PDU contains audio data when the value in the LLID field is 00.

23. The electronic device of claim 13, wherein the receiving electronic device is an assistive-listening device.

* * * * *